Dec. 30, 1952     A. S. ORLANDI     2,623,295
GEAR CHECKING APPARATUS
Filed April 18, 1946     7 Sheets-Sheet 1
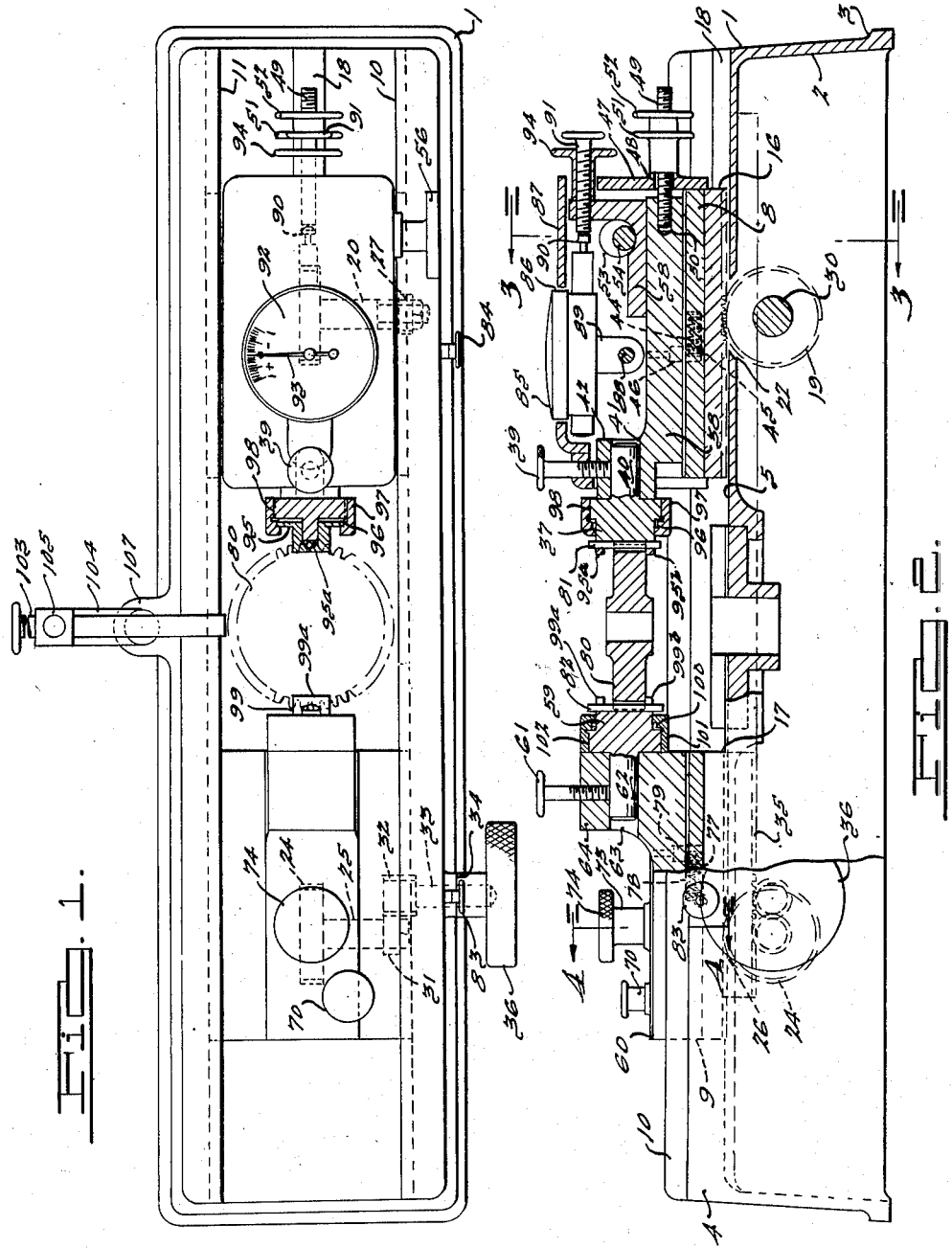
INVENTOR.
Americo S. Orlandi.
BY
Harness, Dickey & Pierce.
ATTORNEYS.

Dec. 30, 1952  A. S. ORLANDI  2,623,295
GEAR CHECKING APPARATUS
Filed April 18, 1946  7 Sheets-Sheet 2

INVENTOR.
Americo S. Orlandi.
BY
Harness, Dickey & Pierce
ATTORNEYS.

Dec. 30, 1952   A. S. ORLANDI   2,623,295
GEAR CHECKING APPARATUS
Filed April 18, 1946   7 Sheets-Sheet 3

INVENTOR.
Americo S. Orlandi.
BY
Harness, Dickey & Pierce
ATTORNEYS.

Dec. 30, 1952  A. S. ORLANDI  2,623,295
GEAR CHECKING APPARATUS
Filed April 18, 1946  7 Sheets-Sheet 4
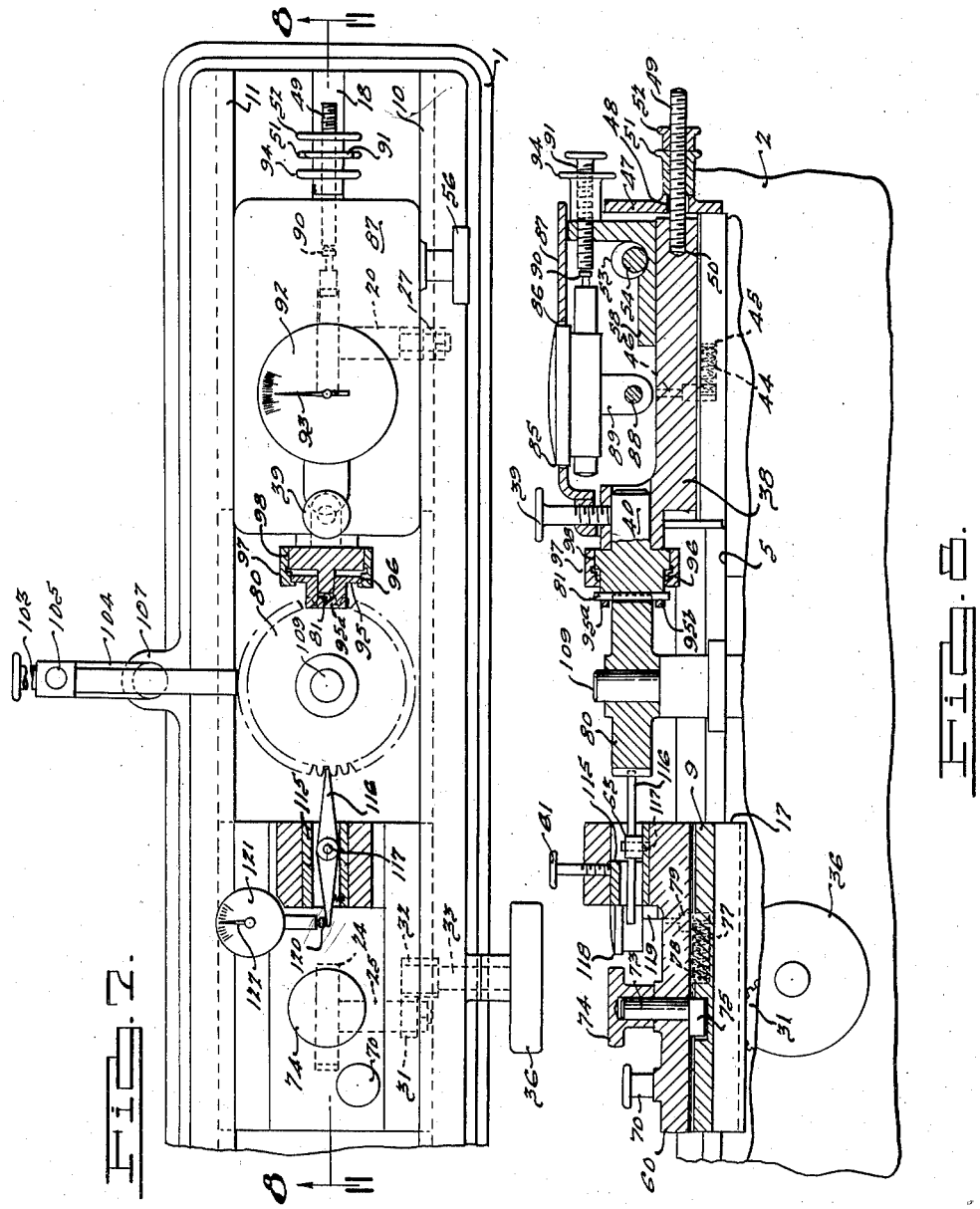
INVENTOR.
Americo S. Orlandi
BY
Harness, Dickey & Pierce
ATTORNEYS.

Dec. 30, 1952  A. S. ORLANDI  2,623,295
GEAR CHECKING APPARATUS
Filed April 18, 1946  7 Sheets-Sheet 5

INVENTOR.
Americo S. Orlandi.
BY
Harness, Dickey & Pierce.
ATTORNEYS

Dec. 30, 1952  A. S. ORLANDI  2,623,295
GEAR CHECKING APPARATUS
Filed April 18, 1946  7 Sheets-Sheet 6
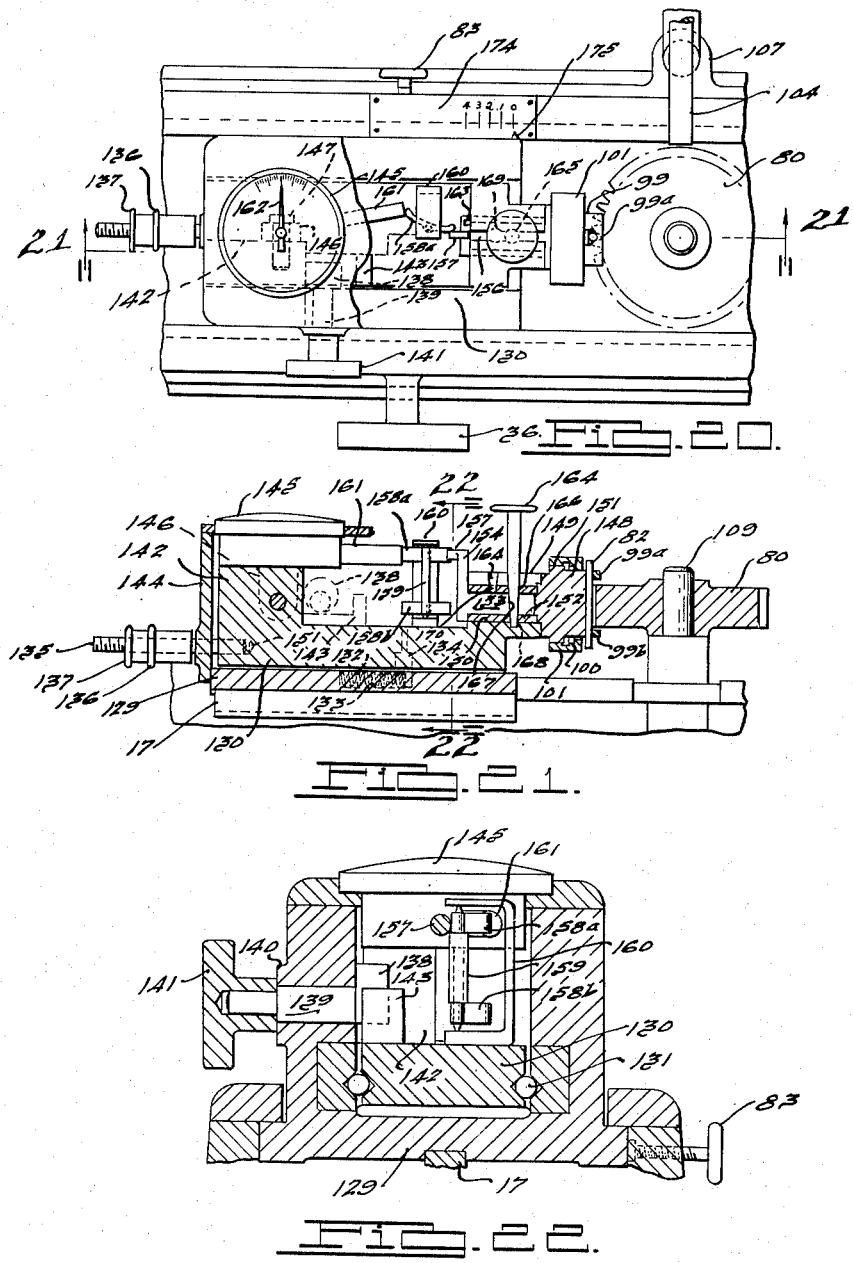
INVENTOR.
Americo S. Orlandi.
BY
Harness, Dickey & Pierce.
ATTORNEYS.

Dec. 30, 1952 A. S. ORLANDI 2,623,295
GEAR CHECKING APPARATUS
Filed April 18, 1946 7 Sheets-Sheet 7
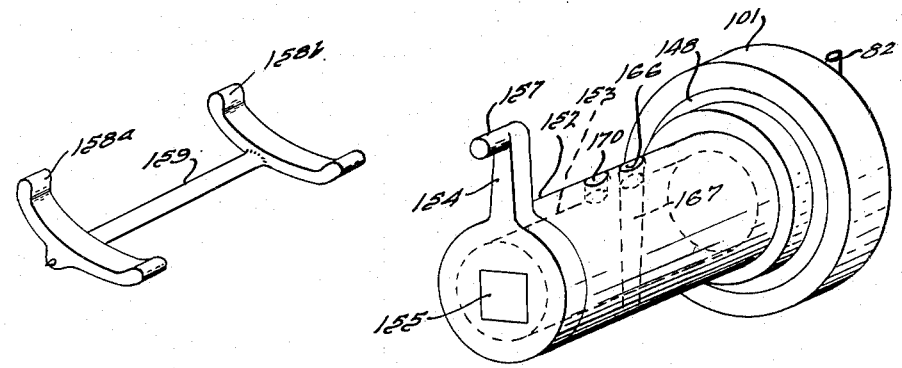
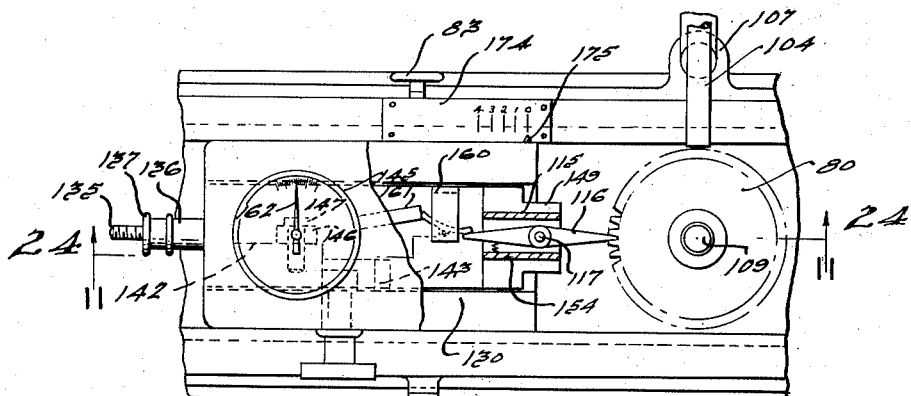
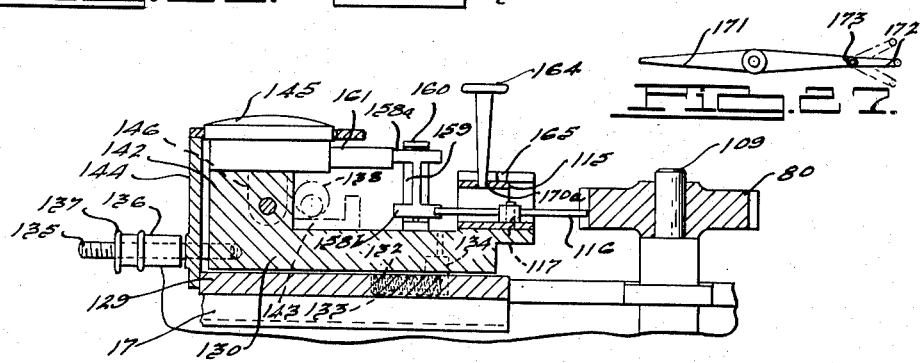
INVENTOR.
Americo S. Orlandi.
BY
Harness Dickey & Pierce
ATTORNEYS.

Patented Dec. 30, 1952

2,623,295

UNITED STATES PATENT OFFICE 2,623,295

GEAR CHECKING APPARATUS

Americo S. Orlandi, Detroit, Mich.

Application April 18, 1946, Serial No. 663,147

6 Claims. (Cl. 33—179.5)

This invention relates to gear checking apparatus, and has particular relation to a gear checker in which the gear to be checked may be positioned between laterally spaced anvils adapted to mount rolls capable of entering between the flanks of the gear teeth for checking the pitch diameter of such gear.

It is conventional practice to check the pitch diameter of gears by means of a micrometer and a pair of rolls. In such practice, it is very difficult to hold the rolls in position while setting the micrometer, and it is also extremely difficult to locate the high point on the diameter of the rolls. Another difficulty, is the human element which enters into checking gears in this manner. Inasmuch as the operator is required to feel when the micrometer is properly set, it is readily apparent that each operator will differ to some extent, even with experience. This results in different readings on identical gears when taken by different operators.

It is therefore, a primary object of the present invention to provide a gear checking apparatus in which a gear to be checked may be positioned between rolls carried by anvils which have been accurately and precisely located in predetermined position before the rolls are fixed thereto.

Another object of the present invention is to provide apparatus for checking gears in which a gear to be checked may be positioned between rolls which are adapted to exert a uniform pressure against the flanks of the gear teeth as said rolls enter diametrically opposed interdental spaces on such gear.

Another object of the invention is to provide a gear checker having opposite, movable anvils with flat faces adapted to receive therebetween gage blocks to accurately and precisely position the same in predetermined adjusted position while a roll-mounting means on each anvil is in position.

A further object of the present invention is to provide gear checking means in which a mandrel for supporting a gear to be checked may be accurately and precisely positioned from a roll-supporting anvil, while the means for mounting the roll to the anvil is in position on said anvil.

A further object of this invention is to provide in a gear checking apparatus means for mounting a roll to each of a pair of flat faced, opposite, movable anvils which means also provides for supporting a gear to be checked as the rolls enter diametrically opposed interdental spaces in the gear.

Still further, the checking device of the present invention contemplates the provision of apparatus from which gear checking rolls may be removed for checking gear blanks or other parts between flat-face, opposed anvils.

A still further object of the present invention is to provide gear checking apparatus for checking parallelism of gear teeth.

A still further object of the present invention is to provide a gear checking apparatus of the character described for checking pitch diameter of a gear which may be readily and quickly modified for checking eccentricity or backlash and which may be operated by semi-skilled or relatively unskilled labor to accomplish such gear checking with extreme accuracy.

Further objects and advantages of the invention will be apparent from the description which follows, and construed in connection with the accompanying drawings in which like numerals indicate like parts wherever shown and wherein:

Fig. 1 is a plan view of a gear checking apparatus embodying the improvements of the present invention;

Fig. 2 is a front, sectional elevation of the apparatus of Fig. 1;

Fig. 7 is a broken, plan view of the gear checking apparatus altered for checking backlash of a gear, in which one of the anvils is replaced with a movable lever and indicating dial;

Fig. 8 is a section taken on line 8—8 of Fig. 7, illustrating the gear held in position by a mandrel as the lever engages the flanks thereof while checking backlash;

Figure 12:
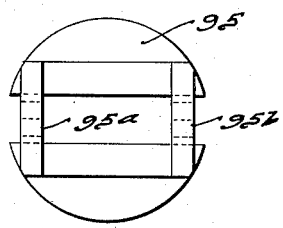
Figure 13:
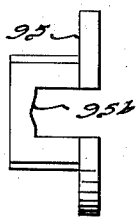
Figure 14:
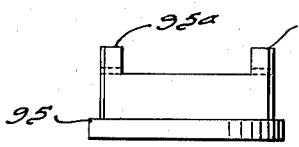
Figure 15:
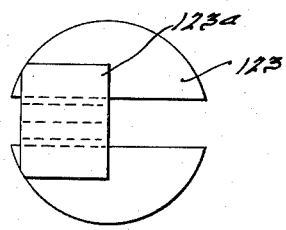
Figure 16:
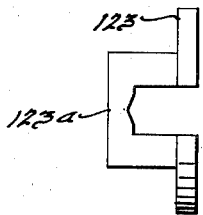
Figure 18:
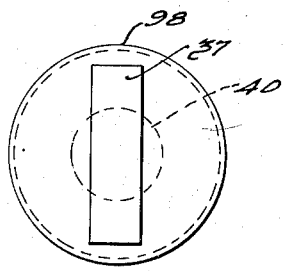
Figure 17:
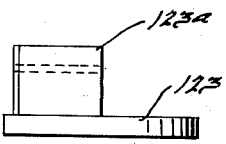
Figure 19:
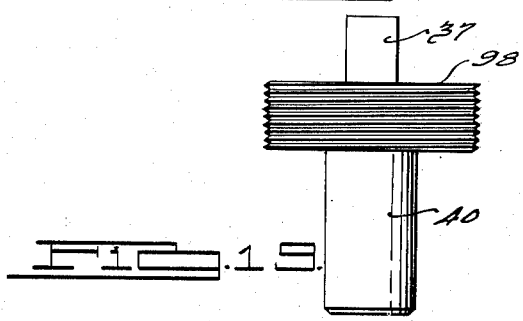

Figs. 12 to 14 inclusive are views of a double jaw adapted to support a circular gaging body;

Figs. 15 to 17 inclusive are views of a single jaw for supporting a circular gaging body;

Figs. 18 and 19 are views of a flat face anvil for use with the gear checker of this invention;

Figure 20 is a broken plan view of a modification of the invention illustrating another form of slide on the left end of the machine;

Figure 21 is a sectional elevation taken substantially along line 21—21 of Figure 20 and illustrating the apparatus for checking the parallelism of gear teeth;

Figure 22 is a transverse section taken on line 22—22 of Figure 21 showing the pivotally supported curved levers which actuate the indicator;

Figure 23 is a broken plan view of the modification shown in Figure 20 with a sleeve and indicating arm assembly in position for checking the backlash of a gear;

Figure 24 is a sectional elevation taken substantially on the line 24—24 of Figure 23 showing the backlash indicating arm in contact with one of the curved levers adapted to transmit movement of the arm to the indicator;

Figure 25 is a perspective view of the curved levers for actuating the indicator;

Figure 26 is a perspective view illustrating the assembly for imparting rotative movement of a roll contacting the gear tooth flanks to one of the curved levers of Figure 25; and Figure 27 is a plan view of a modified form of indicating arm for use with the backlash checking sleeve.

In the machine of this invention, two main carriages are slidably positioned on a base in lateral spaced relationship. Each of said carriages provides for slidably mounting on the upper surface thereof anvil-supporting slides. Such anvils are maintained in a lateral, spaced relationship with respect to each other and adapted to mount jaws carrying rolls capable of entering between flanks of gear teeth. These anvils may be accurately and precisely spaced a predetermined distance apart before the gear checking operation takes place. When the anvils have thus been positioned, each of the main carriages is rigidly and positively locked in position. One of the anvil supporting slides is also locked in position while the other is resiliently held by spring means. A rotatable eccentric is provided to laterally move this slide in order that the gear to be checked may be introduced between said rolls. After the gear is introduced between said rolls, the eccentric is again turned permitting the spring means to resiliently urge the rolls on said anvils to enter diametrically opposed interdental spaces of such gear. In this manner, the gear to be checked is held between the rolls and any differences in such diameter read upon the scale of an indicator provided on said resiliently held anvil carriage.

In order to check a gear for concentricity in this gear checking apparatus, a mandrel is placed in a central opening in the base of the machine. The gear to be checked is mounted on said mandrel in position to permit the roll on the spring-loaded slide to enter into a tooth space on the gear. With the gear thus supported, it may be rotated and the variations in concentricity thereof read on the dial of the indicator.

It is also possible to check the backlash of the gear in the gear checking apparatus of this invention by replacing the rigidly held anvil with a centrally pivoted lever adapted to engage an indicating means. The gear to be checked is mounted on the mandrel in such position that the roll associated with the spring-loaded slide may fully enter the tooth space on the gear. Such roll is then backed off the desired amount, which amount represents the correct backlash, and the gear is oscillated as one end of the pivotally mounted lever is permitted to engage a flank of a tooth on the opposite side of the gear. The extent of such oscillation is read on the dial of the indicator, contacted by the other end of the lever, and any error may be readily detected.

In order to describe the invention more fully, reference is made to the figures in which a base is generally indicated at 1. This base may be of hollow, integral construction with a downwardly directed skirt-like portion 2 to house certain of the apparatus interiorly therein. Such skirt portion 2 may be of suitable height and provided with a foot 3 to adapt the checking apparatus to be mounted upon a base or table such as may be found in any shop. This base is provided with a lip 4 extending around its upper portion and has a table-like portion 5 integral with such skirt-like wall 2.

Figure 3:
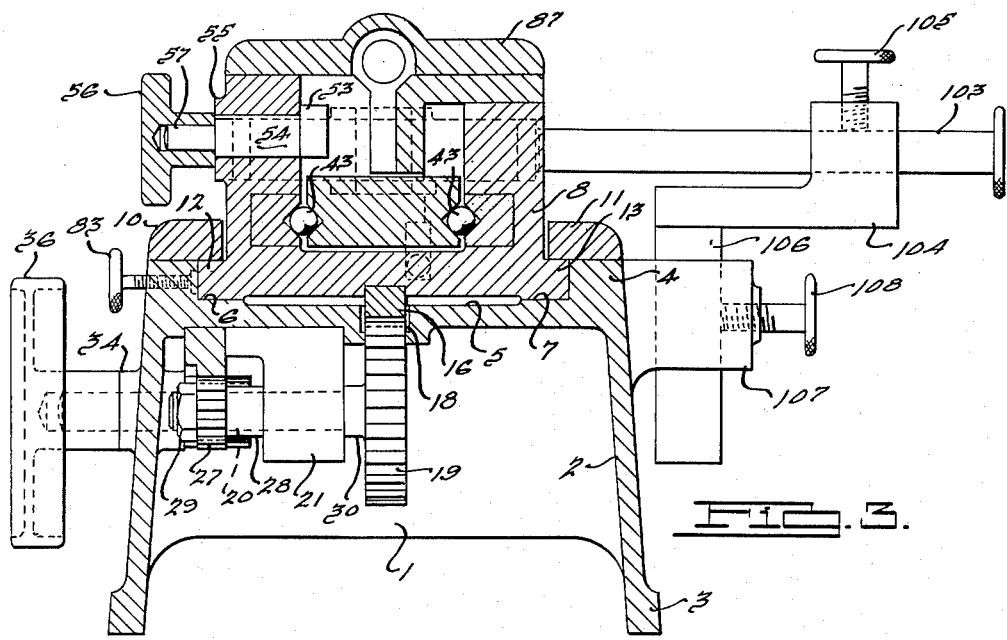
Figure 3 is a transverse section taken substantially on line 3—3 of Fig. 2, illustrating the driving means for the slidable carriages.

On the table portion 5, machined surfaces are provided at 6 and 7, as may be seen in Fig. 3, to serve as rails for slidably receiving the main carriages 8 and 9, respectively. The inner face of the lip 4 is machined to form a surface perpendicular to rail 6 at the left side, and to rail 7 on the right side, for holding said carriages against side movement. A keeper bar 10 is anchored to lip 4 on the left, and another keeper bar 11 anchored to lip 4 on the right side of the apparatus. These bars overlie shoulders 12 and 13, respectively, on carriage 8, and shoulders 14 and 15, respectively, on carriage 9, to positively secure said carriages for sliding movement on the rails.

This sliding movement of the carriages is effected by rack 16, anchored to depend centrally from the lower surface of carriage 8, and rack 17 anchored to similarly depend from the lower surface of carriage 9.

A trough-like depression 18 is provided in table 5, immediately below carriage 8, into which rack 16 is permitted to extend to mesh gear 19. Such gear is rotatably supported by an integral shaft 20 journaled for rotation in bearing 21. An opening 22, provided in the lower surface of depression 18, permits gear 19 to mesh rack 16 in this manner.

Below carriage 9, a similar trough-like depression 23 is provided into which rack 17 extends to mesh gear 24. Such gear is rotatably supported upon shaft 25 journaled for rotation in a bearing, not shown, but which is identical to bearing 21. An opening 26 in depression 23 permits gear 24 to extend therethrough for mating rack 17.

Rotation of gear 19 is accomplished by gear 27 which is on the opposite end of shaft 20. Gear 27 is spaced from bearing 21 by means of bushing 28 and held to said shaft 20 by means of nut 29 which threadably engages the adjacent portion of such shaft. It will be observed that an integral embossment is formed at the side of gear 19, which embossment defines a radial annular shoulder 30. When such nut 29 is drawn tightly against the face of gear 27, shoulder 30 on such shaft 20 is drawn against an adjacent face of bearing 21, securing gears 19 and 27 against longitudinal movement.

Rotation of gear 24 is accomplished by gear 31 fixed to shaft 25. This gear meshes a wide-face gear 32 which is rotatably supported upon shaft 33 journaled for rotation in bearing 34. An elongated rack 35 extends between gears 27 and 32, meshing said gears. It is pointed out that the width of the teeth of gear 32 is sufficient to permit such gear to mesh gear 32 and rack 35.

Obviously, as rotation of gear 32 is effected by means of shaft 33, which has a conveniently accessible handwheel 36 integrally secured thereto, rack 35 will shift. This shifting of rack 35 serves to effect rotation of gear 27, which rotates gear 19, in the same direction gear 32 is rotating. Simultaneously, rotation of gear 32 causes rotation of gear 31, and therefore gear 24, in an opposite direction. Inasmuch as gears 19 and 24 are thus rotated oppositely, it may be seen that their respective racks will effect shifting of carriages 8 and 9 toward or away from each other, depending upon the direction of rotation given to handwheel 36.

To provide for positioning anvil 37, such anvil is secured to slide 38 mounted on carriage 8 for movement therewith and for movement independent thereto. Such anvil 37 is secured to slide 38 by means of thumb screw 39 which frictionally engages shank 40 of this anvil, which is received within opening 41 of an upwardly-directed projection 42 on such slide.

This slide 38 is supported for independent movement on said carriage 8 by means of balls 43 held in the V-shaped raceways provided therefor. Resilient mounting of said slide is accomplished by spring 44 contained in a recessed opening 45 in carriage 8. Such spring bears against an end of recess 45 and against pin 46 which depends from slide 38. This pin 46 is adapted to be shifted in recess 45, as will hereinafter become more clear, to permit such independent movement of slide 38.

As a means for positioning slide 38 in predetermined location on carriage 8, a bearing plate 47 is anchored to the rear of carriage 8. Such bearing plate provides an opening 48 therethrough through which stud 49 is permitted to extend to threadably engage a tapped opening 50 in slide 38. A nut 51 threadably engages the stud 49 and abuts the rear face of bearing plate 47. Upon tightening nut 51, slide 38 may be brought into predetermined adjusted position after which lock nut 52 is tightened against nut 51.

To permit independent movement of slide 38, it is pointed out that such slide is not brought tightly against the forward face of bearing plate 47, but some clearance is allowed, as indicated in Fig. 2.

Independent movement of slide 38 is accomplished by means of eccentric 53. Such eccentric 53 is integral with shaft 54 which is journaled for rotation within bearing 55 in a side wall of carriage 8. A handwheel 56, fixed to a reduced portion 57 of shaft 54, may be rotated for effecting rotation of such shaft. Eccentric 53 is thereby caused to rotate and in so doing bear against an upright leg on bracket 58. Inasmuch as shaft 54 is mounted on carriage 8, and bracket 58 is secured to slide 38, it will be appreciated that rotation of eccentric 53 serves to cause shifting of slide 38 independently of carriage 8.

To position anvil 59 opposite anvil 37, such anvil 59 is secured to slide 60 mounted on carriage 9. This anvil is secured to slide 60 by means of a thumb screw 61 which frictionally engages shank 62 of this anvil when said shank is received within opening 63 of an upwardly-directed projection 64 on slide 60.

Slide 60 is mounted upon machined surface 65 provided in a groove in the upper surface of carriage 9 for movement with the carriage or independent movement with respect thereto. Keeper bars 66 and 67 overlie shoulders 68 and 69, respectively, on said slide 60 to positively maintain said slide within the groove provided therefor in carriage 9. A lock pin 70 extending through mating openings 71 and 72 provided in slide 60 and carriage 9, respectively, positively locks said members together when it is desirable to move the same as an integrated unit.

In order to accomplish the independent movement of slide 60, lock pin 70 may be moved upwardly until the bottom of it clears the upper limit of openings 72. After pin 70 has been thus raised, shaft 73 may be rotated by means of a conveniently accessible handwheel 74 secured thereto. Rotation of shaft 73 in this manner, causes the integral eccentric 75 on such shaft to be rotated in opening 76, provided therefor in carriage 9, effecting movement of slide 60.

To resiliently mount slide 60, carriage 9 provides a recessed opening 77 in which spring 78 is disposed. Such spring 78 bears against an end of the recessed opening 77 and against pin 79 to yieldingly hold slide 60 as the same is moved by means of the eccentric 75. This independent movement of slide 60 is only used when the gear checker is used to check backlash as will hereinafter be described.

To check the pitch diameter of a gear indicated at 80, anvils 37 and 59 are placed in a desired spaced relationship by means of gage blocks or other suitable measuring means. This is accomplished in the following manner. A dimension "M" is determined mathematically or by use of tables in the usual handbooks. Such dimension takes into account the diameter of rolls 81 and 82, which are fixed to anvils 37 and 59, respectively, by jaws in a manner to be later described. Obviously, the diameter of such roll is selected in accordance with the size of the gear to be checked, and such rolls are calculated to enter a tooth space on such gear 80 a predetermined amount. Inasmuch as determination of this dimension "M" is common practice among gear manufacturers and forms no part of this invention, it will not be further described.

The distance which anvils 37 and 59 are thus laterally spaced by means of gage blocks or other suitable measuring is this dimension "M". This spaced relationship of anvils 37 and 59 may be accomplished by means of rotating handwheel 36 to effect shifting of carriages 8 and 9 until the flat faces of said anvils contact the gage with such pressure as will cause slide 38 to back up enough to insure proper spring pressure. At this time, carriages 8 and 9 are locked in position by means of thumb screws 83 and 84, respectively. Such thumb screws are threadably disposed within openings provided therefor in lip 4 of the base portion of the machine and may be turned inwardly to bear against the sides of their respective carriages, locking the same in adjusted position.

With the anvils properly positioned, and with the gage blocks or other measuring means still in position therebetween indicator 85 is set to read zero. This indicator is disposed in opening 86 provided in cover plate 87 of carriage 8. A pin 88 passes through mating openings in the side walls of carriage 8 and stem 89 on indicator 85, securing said indicator to the carriage. Such indicator 85 provides a follower 90 adapted to contact screw 91 which is threadably received in the upright leg of bracket 58 secured to slide 38. With screw 91 in contact with follower 90, the indicator dial face 92 is turned so that the pointer 93 on such indicator reads zero. Lock nut 94, on screw 91, is then tightened against the rear face of the upright leg of bracket 58 for positively locking screw 91 in predetermined adjusted position against follower 90. After this is accomplished, the gage blocks are removed from between the flat faces of the anvils and slide 38 due to the action of spring 44 will advance slightly. In order to protect the indicator, however, the previously described nut 51 and lock nut 52 are turned to prevent full forward movement of slide 38. The gage blocks are then re-inserted as a check to insure that, after adjusting nut 51 and lock nut 52, that indicator 85 still reads zero. After this rolls 81 and 82 are each fixed to its respective anvil.

In order to secure roll 81 to anvil 37, such roll is inserted into double jaw 95. This jaw 95 is positioned within socket 96 provided within collar 97 which threadably engages the annular shoulder 98 of anvil 37. Obviously, tightening of collar 97 will cause roll 81 to become rigidly positioned against the flat face of the anvil. Due to the V in holding elements 95a and 95b of double jaw 95, roll 81 is held precisely on the center of the flat face of anvil 37, perpendicular to table 5 of base 1 at the longitudinal center of the gear checker.

Similarly, roll 82 is fixed to anvil 59 by means of double jaw 99 which is exactly like double jaw 95 illustrated in Figures 12 and 13 inclusive. Such jaw 99 registers within socket 100 provided within collar 101. Such collar 101 threadably engages annular shoulder 102 of anvil 59 and upon being tightened thereon rigidly fixes roll 82 to the flat face of such anvil. Due to the V in holding elements 99a and 99b of double jaw 99, roll 82 is held precisely on the center of the flat face of anvil 59, perpendicular to table 5 of base 1 at the longitudinal center of the gear checker. Thus, roll 82 is directly in line with roll 81. It may now be appreciated that the gage blocks may be inserted between the flat anvil faces simply by removing the rolls therefrom upon loosening the collars. Thus, the apparatus of this invention may be placed in readiness for checking a gear while the means for holding such rolls is mounted thereon.

It is then necessary to determine the interdental spaces on gear 80 in which rolls 81 and 82 are to enter. These are selected in the usual manner; that is to say, visually.

After doing so, eccentric 53 is rotated by means of a handwheel 56 for causing slide 38 to move rearwardly. Gear 80 is then placed between jaws 37 and 59 and slide 38 is returned by means of the handwheel 56 so that the rolls 81 and 82 enter their proper interdental spaces, with the gear resting upon the lower members of jaws 95 and 99, respectively.

Stop 103, slidably supported by bracket 104, is then moved inwardly until the end of said stop is just clear of the teeth of such gear. When this position is reached, thumb screw 105 is turned tight upon stop 103 for locking it in position. Such stop 103 provides a convenient means for locating further gears of the same size or lot to be checked as the same are successively placed in the machine for checking. Bracket 104 which supports such stop is provided with a leg 106 adapted to extend through an opening in bracket 107 which is integrally mounted on the base of the machine. By means of the arm 106, it is possible to raise or lower stop 103 when it is necessary to accommodate various gear widths. This may be accomplished by loosening thumb screw 108 permitting such arm 106 to be shifted in bracket 107 and tightening said thumb screw again when the desired height of stop 103 has been reached.

With the gear to be checked thus positioned between rolls 81 and 82, it will be appreciated that spring 44 carried within the recess 45 of carriage 8 will resiliently urge roll 81 toward roll 82. Inasmuch as this pressure is constant, pins 81 and 82 will be held within the tooth spaces by the same amount of pressure for every gear checked, thereby eliminating any error due to an increase or decrease in this pressure, as is commonly the case, when the gears are checked manually with micrometer and rolls.

In order to remove the gear from the checking apparatus after the same has been checked, it is only necessary to move slide 38 rearwardly by means of the handwheel 56, after which, the gear in the machine may be removed and replaced with the next gear to be checked. Any variation or error in the gear will, of course, immediately be found upon reading the dial.

Figure 5:
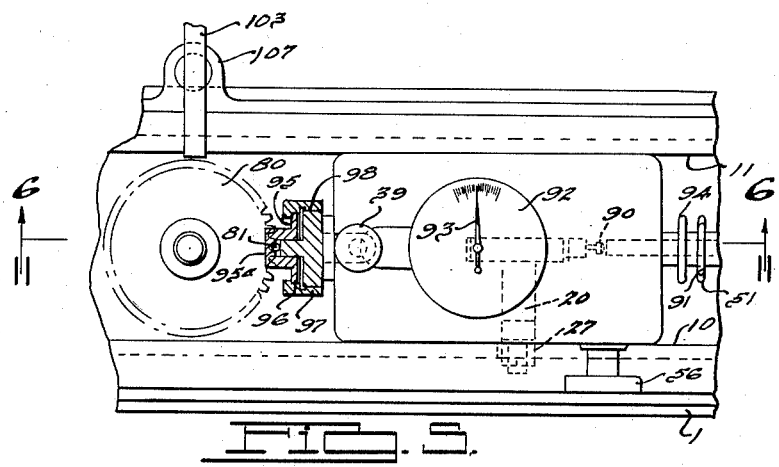
Fig. 5 is a broken plan view illustrating the gear checking apparatus as altered for checking concentricity of a gear.
Figure 6:
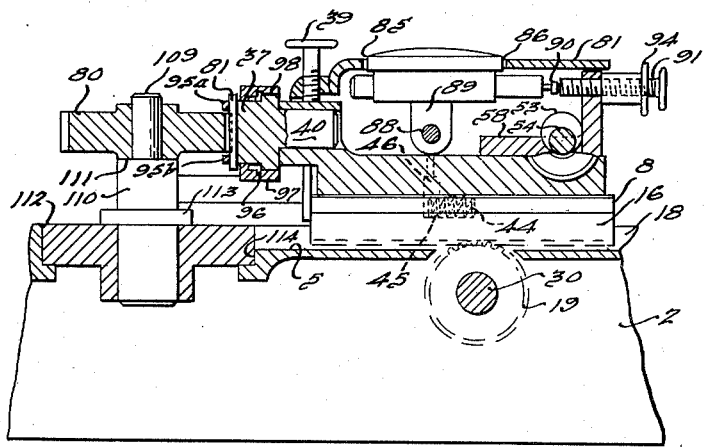
Fig. 6 is a longitudinal section taken on line 6—6 of Fig. 5, illustrating the gear held in position by a mandrel as the same is checked for concentricity.
Figure 10:
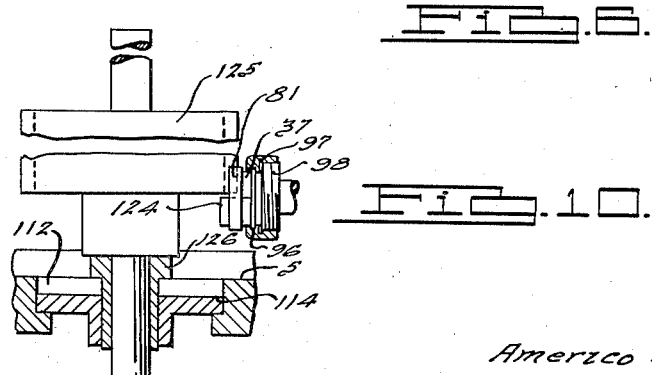
Fig. 10 is a sectional elevation illustrating a wide-faced gear with an outwardly directed shaft on each side being checked for concentricity.

In order to use the gear checker of this invention for checking concentricity of gears, it is necessary to alter the same as indicated in Figs. 5 and 6. Thumb screw 61 in projection 64 of slide 60 is loosened, permitting withdrawal of anvil 59 and with it, roll 82 and the elements requisite for holding said roll to anvil 59.

At this time, mandrel 109, having the enlarged portion 110 upon shoulder 111 of which the gear to be checked is adapted to be supported, is positioned within the opening provided therefor in locator 112 and supported therein in an upright position by means of shoulder 113 on said mandrel. This locator 112 is positioned within a depression 114 centrally of the gear checking apparatus.

Roll 81 is then brought into contact with the gear between one of the tooth spaces on such gear by means of the handwheel 36 with such pressure as will cause slide 38 to back up enough to insure proper spring pressure. After this has been done, carriage 8 is again fixedly positioned by means of the thumb screw 84. Indicator 85 is then set to read zero in the manner described in the foregoing, and the handwheel 56 is turned for moving slide 38 rearwardly. Gear 80 is then turned to another tooth space and handwheel 56 rotated in an opposite direction to bring roll 81 into contact with this tooth space. Any errors will, of course, be read on the dial of the indicator.

To check gears for backlash, the gear checking apparatus of this invention is altered in the following manner. Anvil 59 with roll 82 is removed from slide 60 as previously described. Sleeve 115 is inserted within opening 63 and secured therein by means of thumb screw 61. Within sleeve 115, arm 116 is pivotally supported at 117. An indicator 118 is mounted by means of stem 119 in an opening provided therefor in slide 60. This indicator 118 provides a finger 120 adapted to engage one end of arm 116 and also has the usual dial face 121 with indicating needle 122 for reading the amount of backlash as the checking operation proceeds.

In order to locate anvil 37 for this operation, it is necessary to remove roll 81 by loosening collar 97 so that anvil 37 may again be reset by means of gage blocks. In this case, a figure which is one-half of the previously mentioned "M" value is used, and from this figure is subtracted one-half the diameter of mandrel 109, the diameter of mandrel 109, of course, being taken at the small end upon which gear 80 is disposed during the checking operation. Using the figure determined in this manner, gage blocks are inserted between the mandrel and anvil 37 which is then tightened against such gage blocks by means of the handwheel 36 with such pressure as will cause slide 38 to back up enough to insure proper spring pressure. In this manner, the anvil is accurately and precisely located one-half "M" distance from the center of the gear to be checked. After locating anvil 37 in this manner, carriage 8 is again locked in position by means of thumb screw 84 in the usual manner.

Slide 38 is then adjusted by means of nut 51 in position such that it will not move when the gage blocks are removed from between mandrel 109 and anvil 37, and locked in this adjusted position by means of the lock nut 52 as it is turned tight against nut 51. The dial on indicator 85 is then set to read zero and screw 91 locked by means of lock nut 94.

With roll 81 in position, lock plug 70, on slide 60, is moved upwardly until it clears opening 72 in carriage 9 and slide 60 is moved away from the center of the apparatus by means of handwheel 74.

At this time, slide 38 is also moved away from the center of the gear checker by means of handwheel 56 and gear 80 placed upon mandrel 109.

When gear 80 is in position, slide 38 is permitted to return to its previously adjusted position upon rotation of handwheel 56, permitting spring 44 to urge it toward the center of the gear checker. Slide 60 is also returned by means of spring 77 as handwheel 74 is rotated to permit this spring to return such slide. This allows the end of arm 116, opposite to the end thereof in contact with finger 120 on gage 118, to contact a flank of one gear tooth. Indicator 118 may now be adjusted to read zero.

Due to the fact that gear 80 is cut slightly under size to allow for the backlash determined in the design of such gear, roll 81 will not contact the flanks of adjacent teeth as it enters an interdental space on such gear, but will have clearance equal to the backlash. Thus, it is possible to rotate such gear slightly upon mandrel 109 serving to move lever 116. Such movement of lever 116 may be read on dial 121 of the indicator 118, thereby checking the backlash of the gear.

Figure 9:
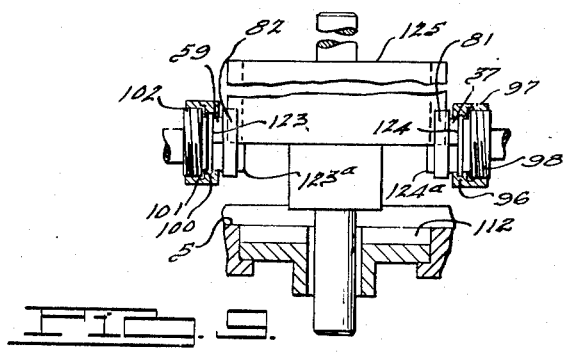
Fig. 9 is a partial, sectional elevation showing the means for checking pitch diameter of a wide gear with a shaft outwardly directed from each side.

Very often it is necessary to check the pitch diameter of a wide faced gear or spline having a shaft extending from each side of the gear. In Figure 9, the modifications necessary to the gear checker of this invention to accomplish such checking are illustrated. In this case, the anvils 37 and 59 are set by means of the gage block in the usual manner. However, due to the face width of the gear, double jaw members 95 and 99, respectively, which are secured to said anvils 37 and 59 may not be used. Such jaws are replaced with single jaw members 123 and 124 having V form holding elements 123ª and 124ª, respectively. Jaws 123 and 124, which are similar, are fixed to the respective anvils by means of collars 97 and 101 in the same manner as were jaws 95 and 99. Such jaws support rolls 81 and 82 in the manner illustrated in the figure, leaving the upper end of said roll free to permit the same to enter in the proper tooth spaces on a gear to be checked. The gear 125 may be placed between such rolls with either side down, depending upon the shape and length of the shafts, one of which extends through the opening provided in locator 112. Checking such gears after these alterations have been made, is accomplished the same as described in the foregoing. When the shaft of the gear is of such size it will not freely pass through the opening provided in locator 112, such locator may be removed as the same is not used while the pitch diameter is checked.

In order to check a gear such as gear 125 for concentricity and backlash, it is only necessary to add a bushing 126 in the opening in locator 112 to support said gear as the same is checked. Other than this and with the modification as illustrated in Figure 9, the operation is exactly the same as previously described.

Figures 4, 11:
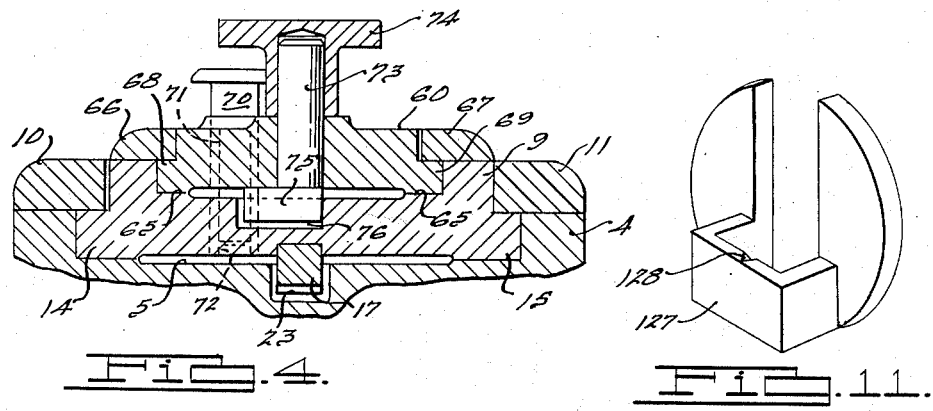
Fig. 4 is a transverse section taken on line 4—4 of Fig. 2, illustrating the means for shifting the left-hand anvil carriages on the main left-hand carriage.
Fig. 11 is a perspective view of a jaw adapted to support a ball.

It is also possible to check helical or herringbone gears on the checking apparatus of this invention. To check helical or herringbone gears, anvils 37 and 59 may be turned in position to mate the angle of the gear being checked. The anvils are, of course, located in the usual manner by means of gage blocks or other suitable measuring means. The rolls are placed in position and moved into the proper tooth spaces, after which the carriages 8 and 9 are located in position by means of the thumb screws. Checking may then proceed exactly as in the case described for the spur gear. However, if the helical angle is too great, it may not be possible to use rolls 81 and 82 to accomplish the checking of such gears. In this case, the jaw member 127, as illustrated in Figure 11, is used. Such jaw 127 has a V-shaped pocket 128 in the lip thereof which is adapted to hold a ball. By replacing the previously described jaws with jaws of the type of jaw 127, and replacing the rolls 81 and 82 with balls adapted to be clamped by said jaws 127, a helical gear having considerable helical angle may be checked in this gear checking apparatus in the same manner as a spur gear.

With the form of the invention as modified in Figure 20, it is possible to check gear teeth for parallelism. For this purpose the previously described carriage 9 is replaced by a carriage 129 which has side walls and is generally similar to carriage 8 on the right side of the gage. The previously described slide 60, for use with carriage 9, is also replaced by a slide 130 mounted on carriage 129. This slide is movable with carriage 129 or independently thereof and for such independent movement is mounted on carriage 129 by means of balls 131 held in the V-shaped raceways provided therefor. Such independent movement of slide 130 is accomplished against the action of spring 132, which is disposed within recess 133 provided in carriage 129. One end of spring 132 abuts an end of recess 133 and the other end contacts pin 134, which depends from slide 130; and when slide 130 is moved independently, spring 132 acts to return the same. The lock pin 70 previously described in connection with slide 60, is replaced by stud 135 threadably secured to slide 130 and having stop nut 136 and lock nut 137 and serve the same purpose as the said pin 70.

In order to provide for independent movement of slide 130 with respect to carriage 129, eccentric 138 is carried by shaft 139 which is journaled for rotation with bearing 140 in a side wall of carriage 129. A handwheel 141, fixed to the reduced end of shaft 139, may be turned to effect rotation of eccentric 138. This eccentric is adapted to engage the inner face of the upwardly directed lug 142 on slide 130 when rotated, and, inasmuch as such slide 130 is movable with respect to carriage 129 in which eccentric 138 is secured by means of shaft 139, it will be observed that slide 130 will shift independently of such carriage 129.

In order to lock slide 130, so that it may not be thus independently moved, an L-shaped member 143 is positioned on slide 130 with one leg immediately below eccentric 138. The upright leg of this L-shaped member is so positioned that eccentric 138 may be rotated to contact the same and when so contacting such leg, stop nut 136 on stud 135 is brought into contact with bearing plate 144 on carriage 129 and locked by means of lock nut 137.

The upwardly directed lug 142 also provides for mounting an indicator 145. This indicator has the tab 146 depending therefrom which may be anchored to a face of such lug 142 by means of a screw or bolt such as shown at 147.

As a means for mounting anvil 148 on slide 130, an upwardly directed projection 149 having opening 150 centrally thereof is provided. Similar to previously described anvil 59, anvil 148 provides a shoulder portion 151 to threadably receive collar 101 by means of which jaw 99 is secured thereto for holding roll 82 as previously described in connection with jaw 59. As may be seen in Figure 26, a bushing 152 receives shank 153 of anvil 148 and, after passing such shank through bushing 152, lever 154, having an enlarged end which is non-rotatably received by the squared portion 155 on shank 153 is placed in position. This assembly is then mounted on slide 130 by placing the same in opening 150 which is slotted at 156, in the top thereof, to permit lever 154 to pass through. Thus, it will be appreciated that anvil 148 is rotatably mounted on slide 130 and held thereon in a manner to be later described.

As will hereinafter become more clear, this rotative movement of anvil 148 permits a gear to be checked for parallelism of the teeth and for this purpose lever 154 has a pin 157, integral therewith, adapted to contact one end of curved lever 158a. This curved lever is on pivot pin 159, as may be seen in Figure 25, and such pivot pin 159 is pivotally mounted in bracket 160 anchored to slide 130. The other end of the curved lever 158a contacts follower 161 of indicator 144 and it will be appreciated that oscillatory movement of lever 154 is imparted to lever 158a, causing the same to effect movement of follower 161 serving to cause the pointer 162 of indicator 145 to register the movement of lever 154.

To prevent injury to the indicator, due to too great movement of lever 154, a stop 163 is positioned in the rear face of projection 149 adjacent one side of lever 154. In this manner, that movement of lever 154 which effects actuation of indicator 145 cannot exceed the limit beyond which said indicator 145 may be safely operated.

Thus, when it is desired to check the parallelism of the teeth of gear 80, a tapered pin 164 is passed through opening 165 in slot 156 and permitted to extend through mating openings 166 and 167 in bushing 152 and shank 153, respectively, to be received by opening 168 in the lower annular surface of projection 149. In the design of this modified form of the present invention, opening 167 in shank 153 is so positioned that when pin 164 is in position, roll 82 is parallel to the longitudinal axis of mandrel 109 and perpendicular to the longitudinal axis of the gear checker of the present invention.

After this, carriages 8 and 129 carrying slides 38 and 130 therewith, are shifted by means of handwheel 36 to bring rolls 81 and 82 into contact with the flanks of adjacent gear teeth on diametrically opposed sides of the gear 80 with such pressure as will cause said slides to back up to insure proper spring pressure. Then, by means of thumb screw 83, which in this modified form is located on the rear of the gage, and thumb screw 84, carriages 8 and 129 are locked in position. After locking carriage 129, slide 130 is backed away from the center of the gage by means of handwheel 141, and indicator 145, which preferably reads .0001 part of an inch, is set to read zero. Tapered pin 164 is then removed and placed in storage opening 169 provided in slot 156 and permitted to extend therethrough to enter a mating opening 170 which is in bushing 152, holding the assembly, consisting of anvil 148, bushing 152 and lever 154, in place on slide 130, but leaving anvil 148 free to rotate. By means of handwheel 141, slide 130 is then advanced again to bring roll 82 again into contact with flanks of adjacent gear teeth. Should this contact cause anvil 148 to rotate, the indicator will not return to its zero reading, and the operator immediately is aware of the fact that the tooth is not parallel to the longitudinal axis of mandrel 80 and perpendicular to the longitudinal axis of the gage and is therefore incorrect.

It is pointed out that the amount of error read on the indicator is, of course, dependent upon the length of lever 154 and in the gage of the present invention this length is such that the reading on the indicator need only be divided by the face width of the gear to obtain the amount of error for each gear.

When it is desired to rotate gear 80 to check another tooth, carriage 8 and slide 130 are moved away from the center of the gage by means of handwheels 56 and 141, respectively. Gear 80 may then be rotated, and the slides returned by means of the handwheels, after which another tooth may be checked for parallelism. This operation may be repeated as often as the operator desires until all, or any number less than all, the teeth have been checked.

In Figures 23 and 24 the previously described sleeve 115 with arm 116 pivotally mounted therein is used for checking backlash of a gear with this modified form of the present invention. In this instance, the assembly consisting of anvil 148, bushing 152 and lever 154 is removed from opening 150 in projection 149, and sleeve 115 placed therein. Previously, sleeve 115 was held in position by a thumb screw 61, however, in this modified form, due to the fact that slot 156 is provided in the top of projection 149, sleeve 115 is provided with an opening 170a adapted to mate opening 169 in projection 149, and pin 164 is permitted to extend therethrough holding sleeve 115 in position within opening 150. Assembled in this position, arm 116 contacts, with its one end, curved lever 158b and with its opposite end, a flank of a tooth on gear 80.

During this backlash checking operation, slide 130 may be moved by means of hand wheel 141 to take arm 116 out of contact with a flank of a tooth of gear 80 and at the same time slide 38 moved by means of handwheel 56 away from the center of the checker to bring roll 81 out of contact with gear 80. This leaves said gear 80 free so that the same may be rotated, after which arm 116 and roll 81 are again advanced toward the center of the checker in order that backlash may be checked at various points on the circumference of the gear. It will be appreciated, therefore, that the movement of arm 116 in contact with the gear flank will be imparted to lever 158b and through pivot pin 159 and lever 158a to follower 161 of indicator 145, such indicator being set to read zero as described in the foregoing and registering thereon the amount of backlash of the gear.

A modification of the arm for use in sleeve 115 is illustrated in Figure 27. In this case, an arm 171 is illustrated which is adapted to be mounted within sleeve 115 in the same manner as arm 116 for pivotal movement about a central point. However, arm 171 has the shiftable end 172 which is pivoted at 173 and may be so moved as to bring end 172 thereof into contact with a tooth flank in which the interdental spaces of a gear are quite large due to the size of such gear.

As a further improvement to the checker of the present invention, a scale 174 has been added, as may be seen in Figures 20 and 23. A pointer for use with scale 174 is provided on carriage 129 and the scale 174 so graduated that it indicates the total distance between the flat faces of the anvils. By using this scale, an operator may adjust the anvils, according to the size of the gear or part to be checked, into a position such that the proper spring pressure will be exerted by the rolls or anvil faces against the part to be checked without resorting to trial or error.

Substitution of slide 130 for slide 60 does not alter in any way the checking operation for checking pitch diameter of a gear. In such operation, the procedure is exactly the same as that described in the foregoing in connection with slide 60 and is not here again described.

The gear checker of the present invention may also be used to check tooth spacing. For this operation either slide 60 or the modified slide 130 may be used. In order to check tooth spacing, stop nut 51 is moved away from bearing plate 47 releasing slide 38 from the position to which the same was adjusted for checking backlash. This adjustment of slide 38 has been described in the foregoing and is not here further described. This release of slide 38 allows roll 81 on anvil 37 to contact the flanks of adjacent teeth of gear 80. Slide 130 is then moved to bring arm 116 of sleeve 115 into contact with a flank of a tooth on gear 80 and indicator 161 set so that pointer 162 reads zero. After this, slides 38 and 130 are moved away from gear 80 by means of handwheels 56 and 141 in the usual manner, freeing gear 80 so that the same may be rotated. Then roll 81 and arm 116 are again brought into contact with flanks of diametrically opposed teeth by means of the handwheels. Indicator 161 should again read zero, indicating that the teeth are properly spaced. If indicator 161 fails to read zero, the operator is made aware of the fact that the teeth are not properly spaced.

It will be clear from the foregoing description that the gear checking apparatus shown in the drawings and described above has been illustrated and described in rather specific detail. Obviously, many modifications, changes, and departures from the above described construction may be made without departing from the generic spirit and scope of the invention as set forth in the subjoined claims.

What is claimed is:

1. Gear checking apparatus comprising, a base, a pair of opposite, movable carriages mounted on said base, means to effect simultaneous movement of said carriages longitudinally of the base and relatively to each other, a slide mounted for independent sliding movement on each of said carriages, a flat face anvil mounted on each slide, the face of each anvil being directed inwardly toward the other of said anvils, mounting means on each anvil adapted to secure a roll against a respective anvil face, said mounting means also adapted to support a gear to be checked, and a spring bearing against one of said slides to urge the anvil carried by said slide toward the opposite anvil to press the rolls on the anvils with constant pressure against adjacent tooth flanks as said rolls enter diametrically opposed interdental spaces in such gear to be checked.

2. Gear checking apparatus comprising, a base, a pair of opposite, movable carriages mounted on said base, means to effect simultaneous movement of said carriages longitudinally of said base relative to each other, slides mounted on the carriages for independent movement thereon parallel to the direction of travel thereof, a flat face anvil mounted on each slide, and the face of each anvil being directed toward the center of the base, mounting means having roll-fastening means covering no more than a small part of the anvil faces and permitting entry of gage blocks between the opposite anvil faces to accurately position the same before the rolls are placed therein, and a gage operatively associated with one of said anvils to indicate errors as a gear to be checked is introduced between said rolls.

3. Gear checking apparatus comprising, a base, a pair of opposite, movable carriages mounted on said base, means to effect simultaneous movement of said carriages longitudinally of the base toward or away from the center thereof, a slide mounted on each carriage for movement therewith or independent slidable movement thereon toward or away from the center of the base, a flat face anvil carried by each slide, the face of each anvil being directed toward the center of the base, a threadably supported collar on each anvil, a jaw member to be received in each collar, a roll in each jaw rigidly secured to the face of its respective anvil when such collars are tightened, said jaws permitting entry of gage blocks between the opposite anvil faces to accurately position said faces before the rolls are placed therein, said jaws adapted to support a gear to be checked as the rolls enter diametrically opposed interdental spaces in such gear.

4. Gear checking apparatus comprising, a base, a pair of opposite, movable carriages mounted on said base, means to effect simultaneous movement of said carriages longitudinally of the base toward or away from the center thereof, a slide mounted on each carriage for movement therewith or independent slidable movement thereon toward or away from the center of the base, a pair of flat face anvils disposed one to each slide with the faces thereof directed toward the center of the base, a threadably supported collar on each anvil, a jaw member to be received in each collar, a roll in each jaw rigidly secured to the face of its respective anvil when said collars are tightened, said jaws permitting entry of gage blocks between the opposite anvil faces to accurately position the same before the rolls are placed therein, said jaws adapted to support a gear to be checked, a spring in one of said carriages, said spring operatively associated with the slide on said carriage to resiliently urge said slide to move independently on said carriage toward the opposite slide thereby effecting the rolls to exert constant pressure against adjacent tooth flanks as the same enter diametrically opposed interdental spaces in the gear to be checked, and an eccentric mounted on said slide for moving the same independently of the carriage against the action of the spring for loading or unloading a gear to be checked.

5. Gear checking apparatus comprising, a base, a pair of opposite, movable carriages mounted on said base, means to effect simultaneous movement of said carriages longitudinally of the base toward or away from the center thereof, a pair of flat face anvils mounted one to each carriage with the face of each anvil directed toward the other of said anvils, said anvils being manually rotatable about their longitudinal axis, and mounting means on each anvil for securing a gaging body against the flat face of each anvil, said flat anvil faces having exposed areas permitting gage blocks to be inserted between the opposite flat faces of the anvils to accurately position the same before the gaging bodies are placed therein, said mounting means also adapted to support a gear to be checked as the gaging bodies enter diametrically opposed interdental spaces in such gear.

6. In a gear checker, a pair of opposite, movable slides, means to move said slides in unison toward or away from each other, a pair of flat face anvils mounted one to each slide and movable therewith, said anvils being disposed so the flat face of each anvil is directed toward the face of its opposite and the faces of the anvils defining reference surfaces for conventional measuring and spacing means such as Jo blocks and the like incidental to setting the machine for operation, roll mounting means on each anvil adapted to securely fix a roll to the flat face thereof, said mounting means having roll-fastening means covering no more than a small part of the anvil faces and so arranged that gage blocks may be positioned between the anvil faces before the rolls are fixed thereto while said mounting means are in position, and resilient means bearing against one of said slides to urge the same toward the opposite slide thereby causing rolls carried by the anvils to exert a uniform pressure on the flanks of teeth of a gear to be checked as said rolls enter diametrically opposed interdental spaces on such gear.

AMERICO S. ORLANDI.

REFERENCES CITED

The following references are of record in the file of this patent:

UNITED STATES PATENTS

| Number | Name | Date |
|---|---|---|
| 335,214 | Corb | Feb. 2, 1886 |
| 1,392,313 | Fallow | Oct. 4, 1921 |
| 1,667,562 | Neubauer | Apr. 24, 1928 |
| 1,854,244 | Allison | Apr. 19, 1932 |
| 1,910,467 | Heckersdore | May 23, 1933 |
| 2,199,236 | Bigwood | Apr. 30, 1940 |
| 2,431,021 | Bourdelais | Nov. 18, 1947 |
| 2,445,402 | Malmberg | July 20, 1948 |
| 2,447,445 | Widen | Aug. 17, 1948 |